(12) United States Patent
Matsubara et al.

(10) Patent No.: US 10,832,840 B2
(45) Date of Patent: Nov. 10, 2020

(54) POWDER FOR DUST CORES, METHOD FOR PRODUCING SAME, DUST CORE AND METHOD FOR PRODUCING DUST CORE

(71) Applicant: DENSO CORPORATION, Kariya (JP)

(72) Inventors: Ken Matsubara, Kariya (JP); Jung Hwan Hwang, Nagakute (JP); Seishi Utsuno, Nagakute (JP)

(73) Assignee: DENSO CORPORATION, Kariya (JP)

( * ) Notice: Subject to any disclaimer, the term of this patent is extended or adjusted under 35 U.S.C. 154(b) by 212 days.

(21) Appl. No.: 16/064,662

(22) PCT Filed: Dec. 12, 2016

(86) PCT No.: PCT/JP2016/086867
§ 371 (c)(1),
(2) Date: Jun. 21, 2018

(87) PCT Pub. No.: WO2017/110545
PCT Pub. Date: Jun. 29, 2017

(65) Prior Publication Data
US 2019/0006069 A1    Jan. 3, 2019

(30) Foreign Application Priority Data

Dec. 24, 2015 (JP) .................... 2015-251107
May 24, 2016 (JP) .................... 2016-103244

(51) Int. Cl.
*H01F 1/147* (2006.01)
*H01F 1/33* (2006.01)
(Continued)

(52) U.S. Cl.
CPC ............... *H01F 1/147* (2013.01); *B22F 1/02* (2013.01); *C01G 49/0018* (2013.01);
(Continued)

(58) Field of Classification Search
CPC ........ H01F 1/147; H01F 41/0246; H01F 3/08; H01F 1/33; H01F 1/24; B22F 1/02
See application file for complete search history.

(56) References Cited

U.S. PATENT DOCUMENTS 4,032,674 A * 6/1977 Hirabayashi ............ H01F 10/20
                                                            427/130
5,698,131 A * 12/1997 Saitou .................... C01G 49/00
                                                            252/62.56
(Continued)

FOREIGN PATENT DOCUMENTS

JP        H6333722 A      12/1994
JP        H07135106 A     5/1995
(Continued)

OTHER PUBLICATIONS

Machine translation of JP4886965B2, Aisin Seiki (Year: 2012).*

*Primary Examiner* — Bernard Rojas
(74) *Attorney, Agent, or Firm* — Harness, Dickey & Pierce, P.L.C.

(57) ABSTRACT

A powder for dust cores includes an aggregate of soft magnetic particles, each of which includes a soft magnetic metal particle, and a ferrite film that covers a surface of the soft magnetic metal particle and includes ferrite crystal grains having a spinel structure. A diffraction peak derived from the ferrite crystal grains exists in a powder X-ray diffraction pattern. By a method for producing a powder for dust cores, a raw material powder that includes an aggregate of soft magnetic metal particles is prepared. Furthermore, many ferrite fine particles are formed on a surface of each of the soft magnetic metal particles of the raw material powder. Additionally, the ferrite fine particles are coarsely crystallized through heat treatment to form a ferrite film, which
(Continued)

includes ferrite crystal grains having a spinel structure, on the surface of the each of the soft magnetic metal particles.

13 Claims, 17 Drawing Sheets

(51) Int. Cl.
| | |
|---|---|
| H01F 1/24 | (2006.01) |
| B22F 1/02 | (2006.01) |
| C01G 49/00 | (2006.01) |
| H01F 41/02 | (2006.01) |
| C22C 38/00 | (2006.01) |
| H01F 3/08 | (2006.01) |
| B22F 3/02 | (2006.01) |
| C22C 33/02 | (2006.01) |
| B22F 1/00 | (2006.01) |
| B22F 3/10 | (2006.01) |
| B22F 3/24 | (2006.01) |
| B22F 9/08 | (2006.01) |
| B22F 9/16 | (2006.01) |
| B22F 9/02 | (2006.01) |
| H01F 10/20 | (2006.01) |

(52) U.S. Cl.
CPC ..... *C01G 49/0036* (2013.01); *C01G 49/0063* (2013.01); *C01G 49/0072* (2013.01); *C22C 38/00* (2013.01); *H01F 1/24* (2013.01); *H01F 1/33* (2013.01); *H01F 3/08* (2013.01); *H01F 41/0246* (2013.01); *B22F 1/0011* (2013.01); *B22F 1/0096* (2013.01); *B22F 3/02* (2013.01); *B22F 3/10* (2013.01); *B22F 9/026* (2013.01); *B22F 9/16* (2013.01); *B22F 2003/248* (2013.01); *B22F 2009/0824* (2013.01); *B22F 2201/02* (2013.01); *B22F 2998/10* (2013.01); *B22F 2999/00* (2013.01); *C01P 2002/32* (2013.01); *C01P 2002/72* (2013.01); *C01P 2004/03* (2013.01); *C01P 2004/04* (2013.01); *C01P 2004/64* (2013.01); *C22C 33/02* (2013.01); *C22C 33/0235* (2013.01); *C22C 2202/02* (2013.01); *H01F 10/20* (2013.01)

(56) References Cited

U.S. PATENT DOCUMENTS

| | | |
|---|---|---|
| 2005/0133116 A1 | 6/2005 | Nishijima et al. |
| 2019/0316260 A1* | 10/2019 | Matsubara ................ H01F 1/24 |

FOREIGN PATENT DOCUMENTS

| | | |
|---|---|---|
| JP | H10284316 A | 10/1998 |
| JP | 2002289420 A | 10/2002 |
| JP | 2005064396 A | 3/2005 |
| JP | 2005142241 A | 6/2005 |
| JP | 2005154791 A | 6/2005 |
| JP | 2009088502 A | 4/2009 |
| JP | 4886965 B2 * | 2/2012 |
| JP | 2013191839 A | 9/2013 |
| JP | 2014060183 A | 4/2014 |
| JP | 2014080344 A | 5/2014 |
| JP | 2014183199 A | 9/2014 |

\* cited by examiner

TEST SPECIMEN 1 (BEFORE ANNEALING)

TEST SPECIMEN 2 (AFTER 600°C ANNEALING)

POWDER FOR DUST CORES, METHOD FOR PRODUCING SAME, DUST CORE AND METHOD FOR PRODUCING DUST CORE

CROSS REFERENCE TO RELATED APPLICATIONS

This application is a U.S. National Phase Application under 35 U.S.C. 371 of International Application No. PCT/JP2016/086867 filed on Dec. 12, 2016 and published in Japanese as WO 2017/110545 A1 on Jun. 29, 2017. This application is based on and claims the benefit of priority from Japanese Patent Application No. 2015-251107 filed on Dec. 24, 2015, and Japanese Patent Application No. 2016-103244 filed on May 24, 2016. The entire disclosures of all of the above applications are incorporated herein by reference.

TECHNICAL FIELD

The present disclosure relates to powder for dust cores, a method for producing the powder, a dust core, and a method for producing the dust core.

BACKGROUND ART

A dust core has heretofore been used for a motor, an ignition coil, or the like. As a material used for a dust core, a ferrite coated powder formed by coating soft magnetic metal particles with a ferrite film is disclosed in Patent Document 1 for example. In the document, a method of forming such a ferrite film by spraying a processing solution containing a metal element over the surfaces of heated soft magnetic metal particles and then spraying an alkaline solution is described.

PRIOR ART DOCUMENT

Patent Document

Patent Document 1: JP 2014-183199 A

A dust core formed by compacting a conventional powder for a dust core, however, increases an eddy loss largely, and is inferior in heat resistance, when a strain caused by the powder compacting is removed by annealing in order to reduce a loss in a low-frequency area.

SUMMARY OF INVENTION

The present disclosure addresses the above issues. Thus, it is an objective of the present disclosure to provide: a dust core allowing an eddy loss caused by annealing after powder compacting to be inhibited from increasing and improving heat resistance; a method for producing the dust core; powder for the dust cores suitable for obtaining the dust core; and a method for producing the powder for the dust cores.

To achieve the objective, a powder for dust cores in a first aspect of the present disclosure includes an aggregate of soft magnetic particles, each of which includes a soft magnetic metal particle, and a ferrite film that covers a surface of the soft magnetic metal particle and includes ferrite crystal grains having a spinel structure. A diffraction peak derived from the ferrite crystal grains exists in a powder X-ray diffraction pattern.

To achieve the objective, according to a method for producing a powder for dust cores in a second aspect of the present disclosure, a raw material powder that includes an aggregate of soft magnetic metal particles is prepared. Furthermore, many ferrite fine particles are formed on a surface of each of the soft magnetic metal particles of the raw material powder. In addition, the ferrite fine particles are coarsely crystallized through heat treatment to form a ferrite film, which includes ferrite crystal grains having a spinel structure, on the surface of the each of the soft magnetic metal particles.

To achieve the objective, a dust core in a third aspect of the present disclosure is a powder compact of the powder for dust cores, and has its strain removed.

To achieve the objective, a method for producing a dust core in a fourth aspect of the present disclosure, includes a powder compacting process of compacting the powder for dust cores to obtain a powder compact, an annealing process of annealing the obtained powder compact, and a transformation heat treatment process of re-ferritizing FeO, which is produced partially in the ferrite film included in the annealed powder compact, through heat treatment.

A reason why an eddy loss increases in a prior art is estimated to be as follows. In a conventional powder for a dust core, a ferrite film is damaged by friction between the ferrite films and deformation of soft magnetic metal particles during powder compacting. At the time after powder compacting and before annealing, insulation properties are maintained by a gap caused by air to some extent even when a ferrite film in a dust core is damaged. By annealing after powder compacting however, adjacent soft magnetic metal particles touch each other and sinter at the damaged part in a ferrite film. As a result, in a dust core after annealing, the insulation properties of the ferrite film deteriorate and an eddy loss increases. In particular, a ferrite film formed by spraying is in the state of depositing ferrite fine particles over the surfaces of soft magnetic metal particles, and is not dense. As a result, an eddy loss is likely to increase.

In contrast, in an aforementioned powder for a dust core, a ferrite film covering the surfaces of soft magnetic metal particles comprises ferrite crystal grains having a spinel structure, and a diffraction peak derived from the ferrite crystal grains exists in a powder X-ray diffraction pattern. For the reason, the powder for a dust core makes the strength of the ferrite film increase by the ferrite crystal grains coarsened to the extent of the existence of the diffraction peak. As a result, the powder for a dust core can inhibit the ferrite film from being damaged by a high stress during powder compacting. In the powder for a dust core therefore, even when annealing is applied after powder compacting, the ferrite film can inhibit adjacent soft magnetic metal particles from sintering. Therefore, the powder for a dust core can inhibit an eddy loss caused by annealing after powder compacting from increasing, and is suitable for obtaining a dust core having an improved heat resistance.

According to an aforementioned method for producing a powder for a dust core, many ferrite fine particles are formed over the surfaces of soft magnetic metal particles in a raw material powder, and a ferrite film comprising ferrite crystal grains having a spinel structure is formed by crystallizing the ferrite fine particles coarsely by heat treatment. As a result, the method for producing the powder for a dust core makes it possible to: inhibit an eddy loss caused by annealing after powder compacting from increasing; and produce the powder for a dust core suitable for obtaining a dust core having an improved heat resistance.

An aforementioned dust core is a powder compact comprising the powder for a dust core and a strain is removed.

As a result, a dust core having an excellent heat resistance, a high saturation magnetic flux density, and a low loss is obtained.

An aforementioned method for producing a dust core includes an aforementioned transformation heat treatment process. FeO is a substance having a smaller volume specific resistance than ferrite. The volume specific resistance of a ferrite film containing FeO therefore lowers. According to the method for producing a dust core, a film structure changes by annealing for removing a strain in a powder compact and, even when FeO is generated partially in a ferrite film, FeO is ferritized again by transformation heat treatment. As a result, the method for producing a dust core makes it possible to obtain a dust core having an excellent heat resistance, a high saturation magnetic flux density, a low loss, and a high resistivity.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

First Embodiment

Figure 1:
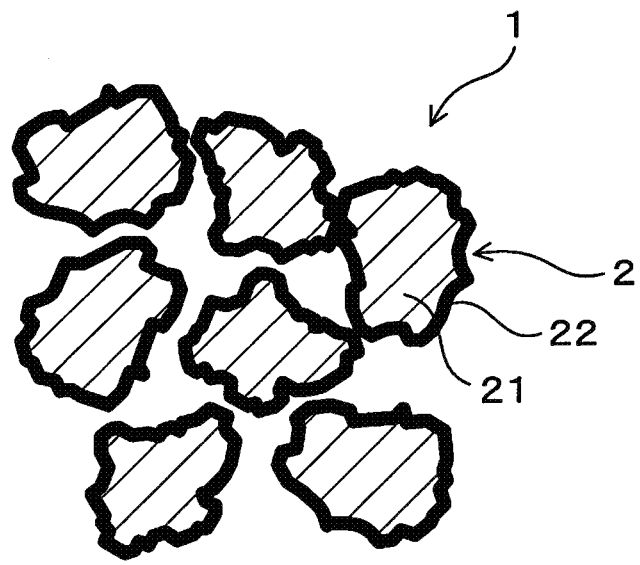
FIG. 1 is an explanatory drawing schematically showing a powder for a dust core according to a first embodiment.
Figure 2:
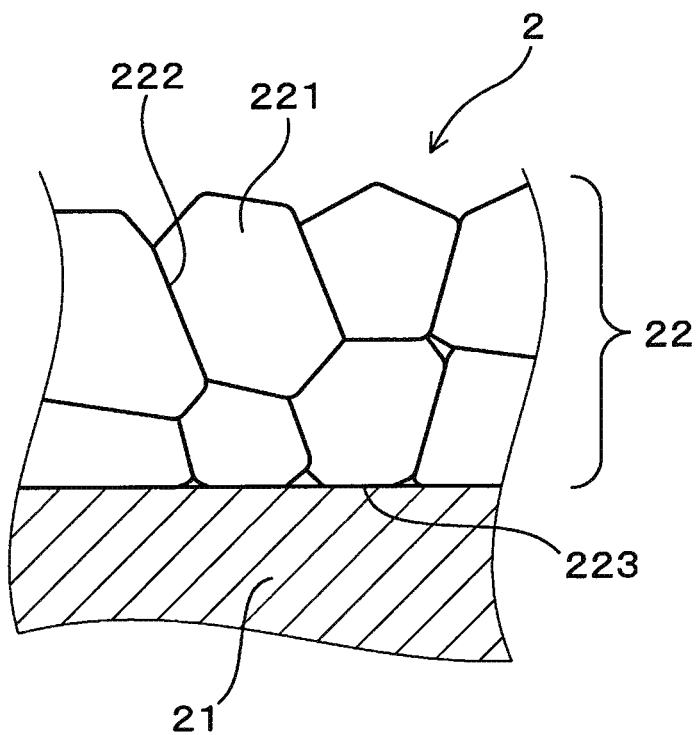
FIG. 2 is an explanatory drawing schematically showing a section of a ferrite film in a powder for a dust core according to the first embodiment.
Figure 3:
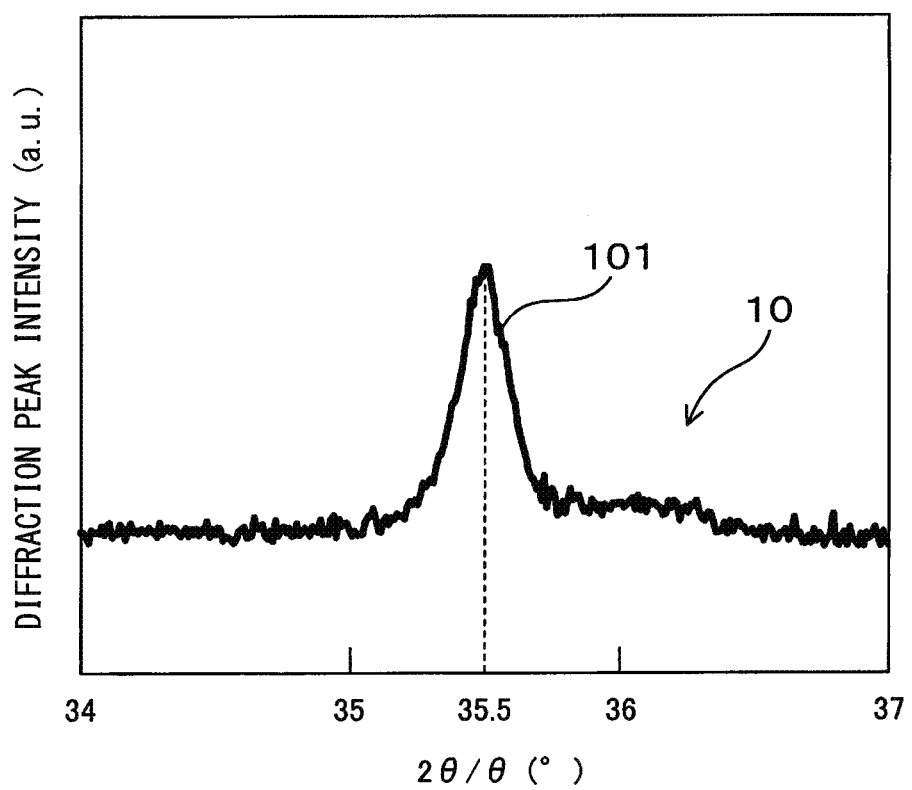
FIG. 3 is an explanatory drawing schematically showing a powder X-ray diffraction pattern of a powder for a dust core according to the first embodiment.

A powder for a dust core according to a first embodiment is explained in reference to FIGS. 1 to 3. As exemplified in FIGS. 1 to 3, a powder for a dust core 1 according to the present embodiment is an aggregate of soft magnetic particles 2. A soft magnetic particle 2 has a soft magnetic metal particle 21 and a ferrite film 22 covering the surface of the soft magnetic metal particle 21. The ferrite film 22 comprises ferrite crystal grains 221 having a spinel structure. A diffraction peak 101 derived from the ferrite crystal grains 221 exists in a powder X-ray diffraction pattern 10 of the powder for a dust core 1. Details are explained below.

As a soft magnetic metal particle 21, a pure iron particle, an Fe-based alloy particle, or the like can be used for example from the viewpoints of improving a saturation magnetic flux density and the like. As the Fe-based alloys for example, an Fe—Si based alloy, an Fe—Co—V based alloy, an Fe—Si—Al based alloy, and others can be exemplified.

The particle size of a soft magnetic metal particle 21 can be preferably 25 µm or more, yet preferably 50 µm or more, or still preferably 75 µm or more from the viewpoints of formability, reduction of hysteresis loss, and the like. Further, the particle size of a soft magnetic metal particle 21 can be preferably 300 µm or less, yet preferably 200 µm or less, or still preferably 106 µm or less from the viewpoints of reduction of an eddy loss and the like. Meanwhile, the particle size of a soft magnetic metal particle 21 is a value obtained by subtracting the thickness of a ferrite film 22 that will be described later from a particle size (diameter) d50 that: is measured in a dry state by using Laser Diffraction Particle Size Analyzer ("ParticaLA-950v2" made by HORIBA, Ltd.) for a powder for a dust core 1; and represents 50% in a cumulative frequency distribution on a volume basis.

A ferrite film 22 preferably covers the whole surface of a soft magnetic metal particle 21 from the viewpoints of making it easier to ensure insulation properties between soft magnetic metal particles 21 in a dust core 4 and the like. Here, as long as aforementioned operational advantages are obtained, a part of the surface of a soft magnetic metal particle 21 may not be covered with a ferrite film 22.

The size of a ferrite crystal grain 221 in a ferrite film 22 can be 10 nm or more. On this occasion, the improvement of the strength of the ferrite film 22 is ensured, an eddy loss caused by annealing after powder compacting can be inhibited from increasing, and a dust core 4 having an improved heat resistance is likely to be obtained.

The size of a ferrite crystal grain 221 can be preferably 30 nm or more, yet preferably 40 nm or more, still preferably 50 nm or more, still yet preferably 60 nm or more, or even still yet preferably 70 nm or more from the viewpoint of further ensuring the above effects. Further, the size of a ferrite crystal grain 221 can be equal to or smaller than the thickness of a ferrite film 22. Specifically, the size of a ferrite crystal grain 221 can be preferably 1,000 nm or less, yet preferably 200 nm or less, or still preferably 100 nm or less from the viewpoints of formability, inhibiting a ferrite film from exfoliating, inhibiting a ferrite film from cracking, and the like. Meanwhile, the size of ferrite crystal grains 221 is an average value of the respective maximum diameters of 10 ferrite crystal grains 221 contained in a ferrite film 22 in a soft magnetic particle 2 that are measured and obtained by using a sectional TEM image of a powder for a dust core 1.

A ferrite film 22 can be configured so as to contain a part where an interface 222 between ferrite crystal grains 221 has a straight-line shape in a sectional view. On this occasion, a gap between adjacent ferrite crystal grains 221 reduces and a dense film is formed. As a result, on this occasion, the improvement of the strength of the ferrite film 22 is ensured, an eddy loss caused by annealing after powder compacting can be inhibited from increasing, and a dust core 4 having an improved heat resistance is likely to be obtained. Here, the sectional view is based on a sectional TEM image.

The chemical composition of a ferrite film 22 is $M_xFe_2O_4$. Here: M can be at least one metal element selected from the group comprising Fe, Cu, Mg, Ni, Zn, and Mn; and X can satisfy the expression $0<X\leq1$. Here, when M contains two or more metal elements, each metal element satisfies the expression $0<X\leq1$. Here, the sum of the values of Xs of the respective elements is 1. On this occasion, a powder for a dust core 1 having a good balance between a saturation magnetic flux density and a volume specific resistance is obtained.

More specifically, the metal element M can be configured so as to contain Mn and Zn or Ni and Zn. On this occasion, a powder for a dust core 1 having a good balance between a saturation magnetic flux density and a volume specific resistance is more likely to be obtained.

The thickness of a ferrite film 22 can be in the range of 20 nm to 600 nm for example. On this occasion, insulation properties between soft magnetic metal particles 21 are likely to be ensured and a dust core 4 advantageous for improving a saturation magnetic flux density is likely to be obtained by an appropriate density. The thickness of a ferrite film 22 can be preferably 10 nm or more, yet preferably 50 nm or more, or still preferably 100 nm or more from the viewpoints of ensuring insulation properties and the like. The thickness of a ferrite film 22 can be preferably 1,000 nm or less, yet preferably 200 nm or less, or still preferably 100 nm or less from the viewpoints of the improvement of a saturation magnetic flux density, the increase of a density, and the like. Meanwhile, the thickness of a ferrite film 22 is an average value of the respective values obtained by: using a sectional TEM image of a powder for a dust core 1; and measuring the thicknesses of the ferrite film 22 in a direction perpendicular to an interface 223 between a soft magnetic metal particle 21 and the ferrite film 22 at three points in one soft magnetic particle 2.

A powder X-ray diffraction pattern of a powder for a dust core 1 is measured by using a powder X-ray diffractometer ("RINT 2000" made by Rigaku Corporation) using a Cu tube as an X-ray source or a measurement device equivalent to the powder X-ray diffractometer. A measurement range of a powder X-ray diffraction pattern 10 is set so as to include a range of 34 to 37° in 2θ/θ where the spinel structure of a ferrite crystal grain 221 is likely to be clearly seen. A diffraction peak derived from ferrite crystal grains 221 having a spinel structure is seen at 2θ/θ=35.5°.

Meanwhile, such a diffraction peak 101 is not seen in a ferrite coated powder formed by depositing ferrite fine particles over the surfaces of soft magnetic metal particles. The rule of "a diffraction peak 101 derived from ferrite crystal grains 221 exists" in a powder for a dust core 1 therefore means that the powder for a dust core 1 has a ferrite film 22 different from a film formed by depositing ferrite fine particles.

More specifically, a powder for a dust core 1 can be configured so that a half-value width of a diffraction peak 101 may be 0.5° or less. On this occasion, an eddy loss caused by annealing after powder compacting can be inhibited from increasing and a dust core 4 having an improved heat resistance is likely to be obtained. Here, the half-value width means a half-value width of a diffraction peak 101 at 2θ/θ=35.5°.

A half-value width can be preferably 0.45° or less, yet preferably 0.4° or less, still preferably 0.35° or less, or still yet preferably 0.3° or less. Here, a half-value width can be 0.18° or more.

A powder for a dust core 1 can contain a lubricant (not shown in a figure) in addition to soft magnetic particles 2. On this occasion, wear or the like caused by friction between ferrite films 22 is likely to reduce during powder compacting. On this occasion therefore, insulation properties are likely to be ensured by a ferrite film 22 after powder compacting. As a lubricant, zinc stearate, lithium stearate, stearic acid amide, or the like can be exemplified.

In a powder for a dust core 1, a ferrite film 22 covering the surfaces of soft magnetic metal particles 21 comprises ferrite crystal grains 221 having a spinel structure and a diffraction peak 101 derived from the ferrite crystal grains 221 exists in a powder X-ray diffraction pattern 10. In the powder for a dust core 1 therefore, the strength of the ferrite film 22 improves by the ferrite crystal grains 221 coarsened to the extent that the diffraction peak 101 exists. As a result, in the powder for a dust core 1, the ferrite film 22 is inhibited from being damaged by a high stress during powder compacting. In the powder for a dust core 1 therefore, the ferrite film 22 can inhibit adjacent soft magnetic metal particles 21 from sintering even when annealing is applied after powder compacting. As a result, a powder for a dust core 1 can inhibit an eddy loss caused by annealing after powder compacting from increasing, and is suitable for obtaining a dust core 4 having an improved heat resistance.

Second Embodiment

Figure 4:
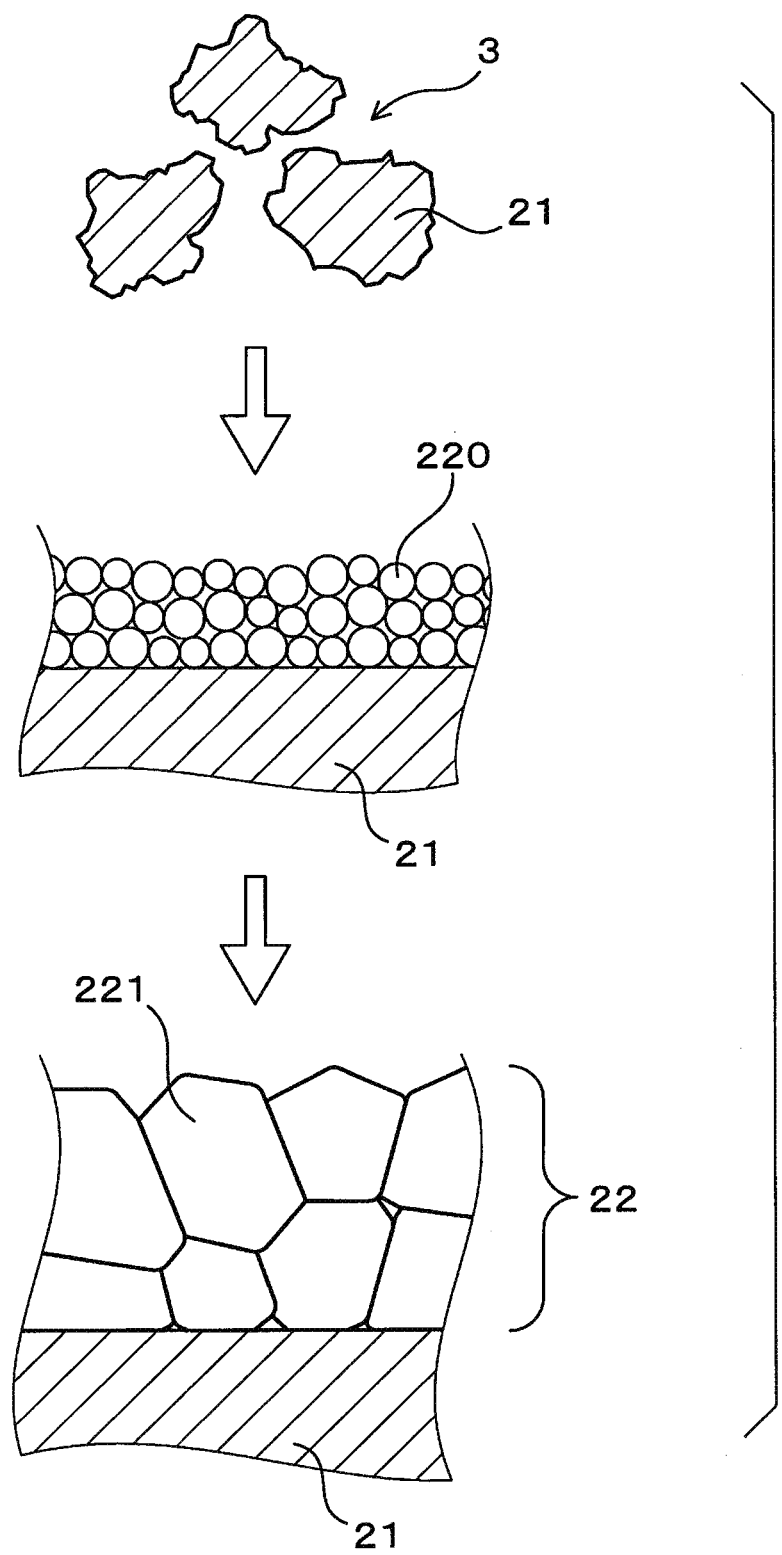
FIG. 4 is an explanatory drawing schematically showing a flow of a method for producing a powder for a dust core according to a second embodiment.

A method for producing a powder for a dust core according to a second embodiment is explained in reference to FIG. 4. Here, in reference signs used in the second embodiment and succeeding embodiments, a reference sign identical to a reference sign used in a foregoing embodiment represents a constituent component or the like identical to a constituent component or the like used in the foregoing embodiment unless otherwise specified.

As exemplified in FIG. 4, in a method for producing a powder for a dust core according to the present embodiment, a raw material powder 3 comprising an aggregate of soft magnetic metal particles 21 is prepared. Further, many ferrite fine particles 220 are formed over the surfaces of the respective soft magnetic metal particles 21 in the raw material powder 3. Furthermore, the ferrite fine particles 220 are crystallized coarsely by heat treatment and a ferrite film 22 comprising ferrite crystal grains 221 having a spinel structure is formed over the surfaces of the soft magnetic metal particles 21.

A raw material powder 3 can be prepared by an atomizing method, a mechanical grinding method, a reduction method, or another method for example. As atomizing methods, a water atomizing method, a gas atomizing method, a gas-water atomizing method, and other methods can be exemplified. Here, a material described in the first embodiment can apply also to a material of the soft magnetic metal particles 21 in the raw material powder 3. Meanwhile, the particle size of a soft magnetic metal particle 21 in a raw material powder 3 is a particle size (diameter) d50 that: is measured in a dry state by using Laser Diffraction Particle Size Analyzer ("ParticaLA-950v2" made by HORIBA, Ltd.) for the raw material powder 3; and represents 50% in a cumulative frequency distribution on a volume basis.

As a method for forming many ferrite fine particles 220 over the surfaces of respective soft magnetic metal particles 21 in a raw material powder 3, a method of: spraying a processing solution containing $Fe^{2+}$ and divalent ions of a metal element M over the raw material powder 3 and spraying a pH adjustment solution over the powder over which the processing solution has been sprayed while heating and stirring the raw material powder 3; and successively washing and drying the powder, or another method, can be used for example. Here, it is also possible to spray a processing solution and a pH adjustment solution alternately and repeatedly during the time before washing and after spraying of the pH adjustment solution. Otherwise, it is also possible to omit the spraying of a pH adjustment solution by spraying a processing solution that has been adjusted to a pH of about 6 to 10 beforehand. By such a method, many ferrite fine particles 220 can be deposited over the surfaces of respective soft magnetic metal particles 21 in a raw material powder 3.

In a method for forming ferrite fine particles 220, a raw material powder 3 can be heated to 90° C. to 150° C. in the atmosphere for example. Further, a processing solution can be an acidic solution. Further, a pH adjustment solution can be an alkaline solution. Further, the particle size of ferrite fine particles 220 can be 5 nm to 35 nm for example. The particle size of ferrite fine particles 220 is an average value of the respective maximum diameters of 10 ferrite fine particles 220 formed over one soft magnetic metal particle 21 that are measured and obtained by using a sectional TEM image. Meanwhile, all the contents described in JP 2014-183199 A can be incorporated into the present description by reference.

A heat treatment temperature of ferrite fine particles 220 during heat treatment can be in the range of 400° C. to 900° C. for example. On this occasion, a balance between the effect of improving the strength of a ferrite film 22 by coarsely crystallizing the ferrite fine particles 220 and the effect of reducing the shrinkage rate of the ferrite film 22 is superior. A heat treatment temperature can be preferably 450° C. or higher, yet preferably 500° C. or higher, or still preferably 550° C. or higher from the viewpoints of making it easier to ensure the effect of improving the strength of a ferrite film 22 by coarsely crystallizing ferrite fine particles 220 and the like. Further, a heat treatment temperature can be preferably 850° C. or lower, yet preferably 800° C. or lower, still preferably 750° C. or lower, or still yet preferably 700° C. or lower from the viewpoints of improving the close contact between a soft magnetic metal particle 21 and a ferrite film 22 without excessively increasing the shrinkage rate of the ferrite film 22 and the like.

A heat treatment time of ferrite fine particles 220 during heat treatment can be in the range of 0.5 hour to 5 hours for example. On this occasion, a balance between the effect of improving the strength of a ferrite film 22 by coarsely crystallizing the ferrite fine particles 220 and the effect of reducing the shrinkage rate of the ferrite film 22 is superior. A heat treatment time can be preferably 0.1 hour or longer, yet preferably 0.5 hour or longer, or still preferably 1 hour or longer from the viewpoints of making it easier to ensure the effect of improving the strength of a ferrite film 22 by coarsely crystallizing ferrite fine particles 220 and the like. Further, a heat treatment time can be preferably 5 hours or shorter, yet preferably 4 hours or shorter, or still preferably 1 hour or shorter from the viewpoints of improving the close contact between a soft magnetic metal particle 21 and a ferrite film 22 without excessively increasing the shrinkage rate of the ferrite film 22 and the like.

An atmosphere of ferrite fine particles 220 during heat treatment can be an inert gas atmosphere, a vacuum atmosphere, or the like. On this occasion, during heat treatment, a ferrite film 22 hardly reacts with an atmosphere gas and the coarsening of ferrite crystal grains 221 is accelerated. Further, there are the advantages of not requiring a powder to be crushed after heat treatment and the like. As an inert gas, specifically, a nitrogen gas, an argon gas, or the like can be exemplified.

A pressure of ferrite fine particles 220 during heat treatment can be preferably $2 \times 10^{-2}$ Pa or more, yet preferably 10 Pa or more, or still preferably 100 Pa or more from the viewpoints of productivity and the like. Further, a pressure can be preferably 101 kPa or less, yet preferably 80 kPa or less, or still preferably 50 kPa or less from the viewpoints of maintaining an oxygen element ratio in a film and the like.

Heat treatment of ferrite fine particles 220 may be applied either after the ferrite fine particles 220 are formed or simultaneously with a time when the ferrite fine particles 220 are formed. Further, heat treatment of ferrite fine particles 220 can be applied also in a powder compacting process during the production of a dust core 4. As a powder compacting method, a compacting method such as hot isostatic pressing, uniaxial or multiaxial pressing, extrusion pressing, or the like can be exemplified.

An aforementioned method for producing a powder for a dust core makes it possible to form many ferrite fine particles 220 over the surfaces of respective soft magnetic metal particles 21 in a raw material powder 3, coarsely crystallize the ferrite fine particles 220 through heat treatment, and resultantly form a ferrite film 22 comprising ferrite crystal grains 221 having a spinel structure. As a result, the method for producing a powder for a dust core makes it possible to inhibit an eddy loss caused by annealing after powder compacting from increasing, and produce a powder for a dust core 1 suitable for obtaining a dust core 4 having an improved heat resistance.

Third Embodiment

Figure 5:
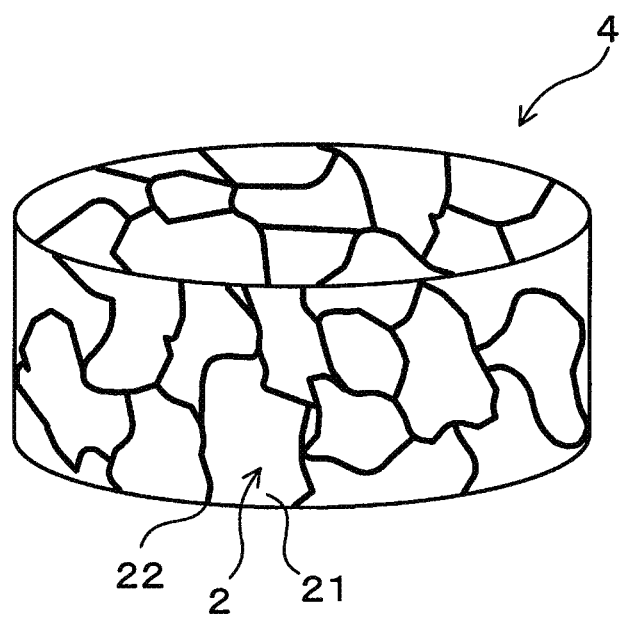
FIG. 5 is an explanatory drawing schematically showing a dust core according to a third embodiment or a fourth embodiment.

A dust core according to the third embodiment is explained in reference to FIG. 5. As exemplified in FIG. 5, a dust core 4 according to the present embodiment is a powder compact comprising a powder for a dust core 1 and a strain is removed. In the present embodiment, a powder for a dust core in the first embodiment can be used as a powder for a dust core 1 constituting a dust core 4.

The shape of a dust core 4 is not particularly limited and various known shapes can be adopted. Meanwhile, whether or not a strain is removed can be determined by measuring a coercive force. A coercive force Hc can be 164 Nm (at 600° C. annealing) or less when soft magnetic metal particles 21 are pure iron particles for example. A coercive force Hc can be 313 Nm (at 1,000° C. annealing) or less when soft magnetic metal particles 21 are Fe—Si based alloy particles for example. A coercive force Hc can be 313 Nm (at 1,100° C. annealing) or less when soft magnetic metal particles 21 are Fe—Co—V based alloy particles for example. A coercive force Hc can be 46 Nm (at 700° C. annealing) or less when soft magnetic metal particles 21 are Fe—Si—Al based alloy particles for example.

A dust core 4 can be obtained by compacting and annealing a powder for a dust core 1 for example. As a powder compacting method, a compacting method such as hot isostatic pressing, uniaxial or multiaxial pressing, extrusion pressing, or the like can be exemplified. A pressure during powder compacting can be specifically in the range of 1,000 MPa to 1,568 MPa for example. Further, an annealing temperature can be specifically in the range of 400° C. to 1,000° C. for example.

A dust core 4 has an excellent heat resistance, a high saturation magnetic flux density, and a low loss because a powder for a dust core 1 is used.

A dust core 4 can be used suitably for a motor, an ignition coil, a fuel injector, and the like.

Fourth Embodiment

A dust core according to a fourth embodiment is explained in reference to FIG. 5. In a dust core 4 according to the present embodiment, a diffraction peak derived from FeO does not exist in a powder X-ray diffraction pattern. Meanwhile, a powder X-ray diffraction pattern of a dust core 4 is measured by using a powder X-ray diffractometer ("RINT 2000" made by Rigaku Corporation) using a Cu tube as an X-ray source or a measurement device equivalent to the powder X-ray diffractometer for a fracture surface sample of the dust core 4. Other configurations are similar to the third embodiment.

On this occasion, FeO having a small volume specific resistance is not contained in a ferrite film 22 and the ferrite film comprises ferrite crystal grains 221. As a result, on this occasion, a dust core having a high resistivity is obtained. Other operational advantages are similar to the third embodiment.

A resistivity of a dust core 4 can be preferably 100 μΩ•m or more or yet preferably 500 μΩ•m or more. Meanwhile, a resistivity of a dust core 4 can be 10,000 μΩ•m or less for example from the viewpoints of the reduction of a magnetic flux density and the like.

Fifth Embodiment

A method for producing a dust core according to a fifth embodiment is explained. A method for producing a dust core according to the present embodiment includes a powder compacting process, an annealing process, and a transformation heat treatment process.

A powder compacting process is a process of compacting a powder for a dust core. As a powder for a dust core, a powder for a dust core exemplified in the first embodiment or a powder for a dust core obtained by a method for producing a powder for a dust core exemplified in the second embodiment can be used. Here, as a powder compacting method, a compacting method such as hot isostatic pressing, uniaxial or multiaxial pressing, extrusion pressing, or the like can be exemplified. A pressure at powder compacting can be specifically in the range of 1,000 MPa to 1,568 MPa for example.

An annealing process is a process of annealing an obtained powder compact. A strain generated in a powder compact during powder compacting is removed by annealing. An annealing temperature can be preferably in the range of 400° C. to 1,000° C. An annealing temperature can be yet preferably 450° C. or higher, still preferably 500° C. or higher, still yet preferably 560° C. or higher, or even still yet preferably 600° C. or higher from the viewpoints of ensuring strain removal and the like. An annealing temperature can be preferably 980° C. or lower, yet preferably 950° C. or lower, still preferably 930° C. or lower, or still yet preferably 900° C. or lower from the viewpoints of reducing the quantity of FeO generated in a ferrite film and the like.

Further, an annealing time can be specifically in the range of preferably 0.5 hour to 5 hours or yet preferably 0.5 hour to 1 hour from the viewpoints of ensuring strain removal and the like.

Furthermore, an annealing atmosphere can be an inert gas atmosphere, a vacuum atmosphere, or the like. An annealing atmosphere may be preferably an inert gas atmosphere for example from the viewpoints of maintaining a film composition and the like. As an inert gas, specifically, a nitrogen gas, an argon gas, or the like can be exemplified.

A transformation heat treatment process is a process of re-ferritizing FeO generated partially in a ferrite film contained in an annealed powder compact by heat treatment.

A heat treatment temperature at a transformation heat treatment process (hereunder referred to as a "transformation heat treatment temperature" occasionally) can be 560° C. or lower. On this occasion, eutectoid transformation of $4FeO \rightarrow Fe_3O_4 + Fe$ is likely to occur, generated $Fe_3O_4$ is likely to transform into $M_xFe_2O_4$, and re-ferritization is accelerated. A transformation heat treatment temperature can be preferably 540° C. or lower, yet preferably 520° C. or lower, or still preferably 500° C. or lower from the viewpoints of accelerating re-ferritization and the like. A transformation heat treatment temperature can be preferably 350° C. or higher, yet preferably 370° C. or higher, or still preferably 400° C. or higher from the viewpoints of ensuring eutectoid transformation and the like.

Further, a heat treatment time at a transformation heat treatment process (hereunder referred to as a "transformation heat treatment time" occasionally) can be preferably 10 minutes or longer, yet preferably 0.5 hour or longer, or still preferably 1 hour or longer from the viewpoints of ensuring eutectoid transformation and the like. A transformation heat treatment time can be preferably 3 hours or shorter, yet preferably 2.5 hours or shorter, or still preferably 2 hours or shorter from the viewpoints of improving the productivity of a dust core and the like.

Furthermore, an atmosphere at a transformation heat treatment process (hereunder referred to as a "transformation heat treatment atmosphere" occasionally) can be a water vapor atmosphere or an inert gas atmosphere. On this occasion, eutectoid transformation can be ensured. When a transformation heat treatment atmosphere is a water vapor atmosphere, Fe generated through eutectoid transformation comes to be $Fe_3O_4$ and $Fe_3O_4$ is likely to transform further into $M_xFe_2O_4$. As a result, Fe having a low volume specific resistance hardly remains in a ferrite film and that is advantageous in increasing the resistivity of a dust core. Here, as an inert gas, specifically, a nitrogen gas, an argon gas, or the like can be exemplified.

The present invention is hereunder explained more specifically by using experimental examples. Experimental Example 1 is explained. A raw material powder comprising an aggregate of pure iron particles is prepared by using a gas water atomizing method. The particle size of the pure iron particles specified by the method is 150 μm.

Figure 6:
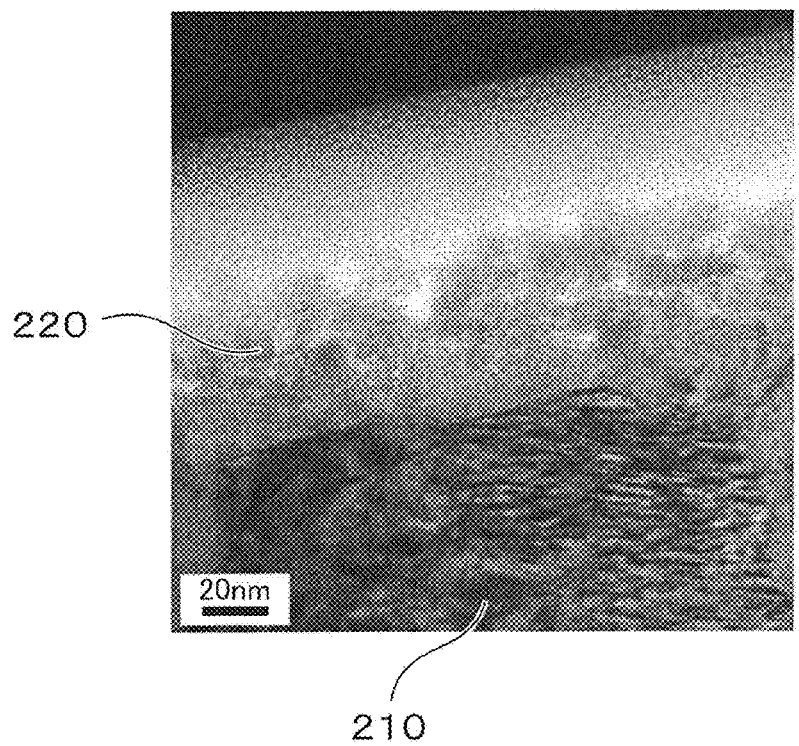
FIG. 6 is a sectional TEM image of a ferrite coated powder observed through a transmission electron microscope, obtained in Experimental Example 1.

Successively, the raw material powder is heated and stirred at 150° C. and a ferrite forming solution as a processing solution is sprayed over the raw material powder in a heated and stirred state. Here, as the ferrite forming solution, a solution produced by adjusting the pH of an aqueous solution containing chloride Fe, chloride Mn, chloride Zn, and urea at pH 8 with an NaOH aqueous solution so as to form a ferrite oxide having the chemical composition of $Mn_{0.5}Zn_{0.5}Fe_2O_4$ is used. Successively, the powder after sprayed with the ferrite forming solution is rinsed with water, washed with ethanol, and then filtered. Resultantly, NaCl, a residue, and the like remaining over the surfaces of the particles are removed. Successively, the powder after cleaned is dried at 80° C. Successively, the powder after dried is classified by passing through a sieve (mesh size: 106 to 212 μm). A ferrite coated powder is obtained through the processes. As shown in FIG. 6, in the obtained ferrite coated powder, many ferrite fine particles 220 are deposited over the surfaces of respective pure iron particles 210. Here, the particle size of the ferrite fine particles 220 is 20 nm.

Figure 7:
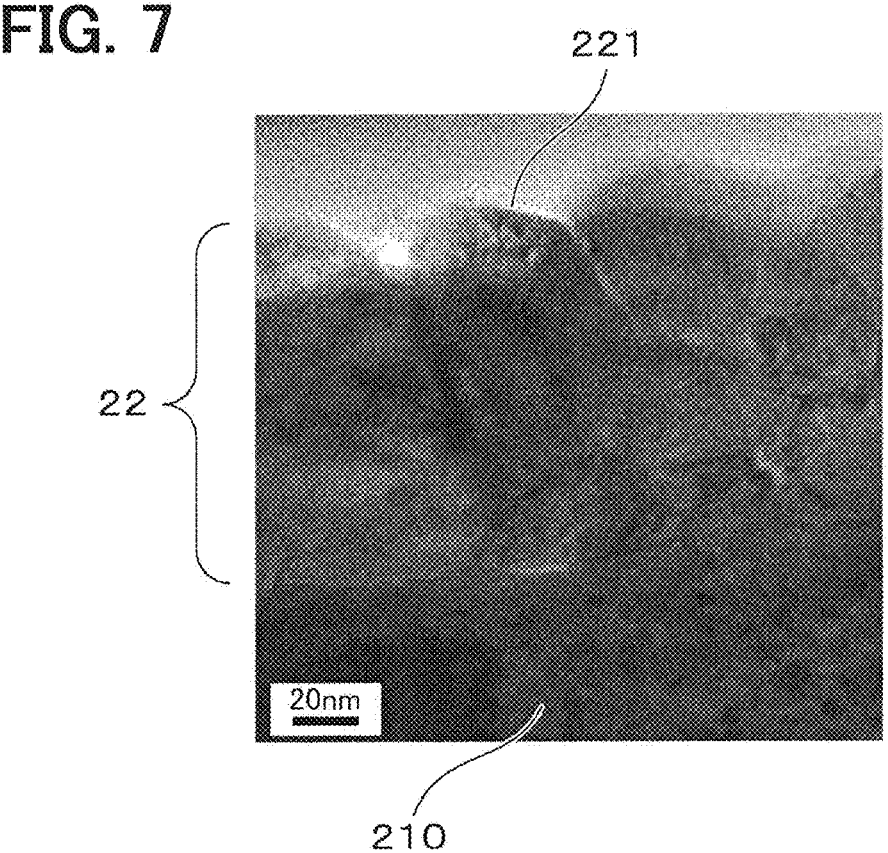
FIG. 7 is a sectional TEM image of a powder for a dust core in Sample 1 observed through a transmission electron microscope, obtained in Experimental Example 1.

Successively, a heat treatment furnace is used and the ferrite coated powder is heat-treated at 600° C. for 1 hour under a pressure of 80 kPa in an $N_2$ gas atmosphere and cooled in the furnace. As a result, a powder for a dust core of Sample 1 is obtained. As shown in FIG. 7, in the powder for a dust core of Sample 1, the surfaces of respective pure iron particles 210 are coated with a ferrite film 22 comprising ferrite crystal grains 221. The ferrite crystal grains in the ferrite film are a substance formed by coarsely crystallizing the ferrite fine particles in the ferrite coated powder before heat-treated through heat treatment. The size of the ferrite crystal grains is 100 nm and the thickness of the ferrite film is 100 nm. Further, as shown in FIG. 7, the ferrite film includes a part where an interface between ferrite crystal grains has a straight-line shape in a sectional view. Here, the particle size of pure iron particles measured by using a sectional SEM image is 150 μm.

A powder for a dust core of Sample 2 is obtained similarly to the production of a powder for a dust core of Sample 1 except that a heat treatment temperature is set at 400° C. Here, the powder for a dust core of Sample 2 also has a ferrite film similar to the powder for a dust core of Sample 1. The size of the ferrite crystal grains however is 60 nm and the thickness of the ferrite film is 100 nm.

Figure 8:
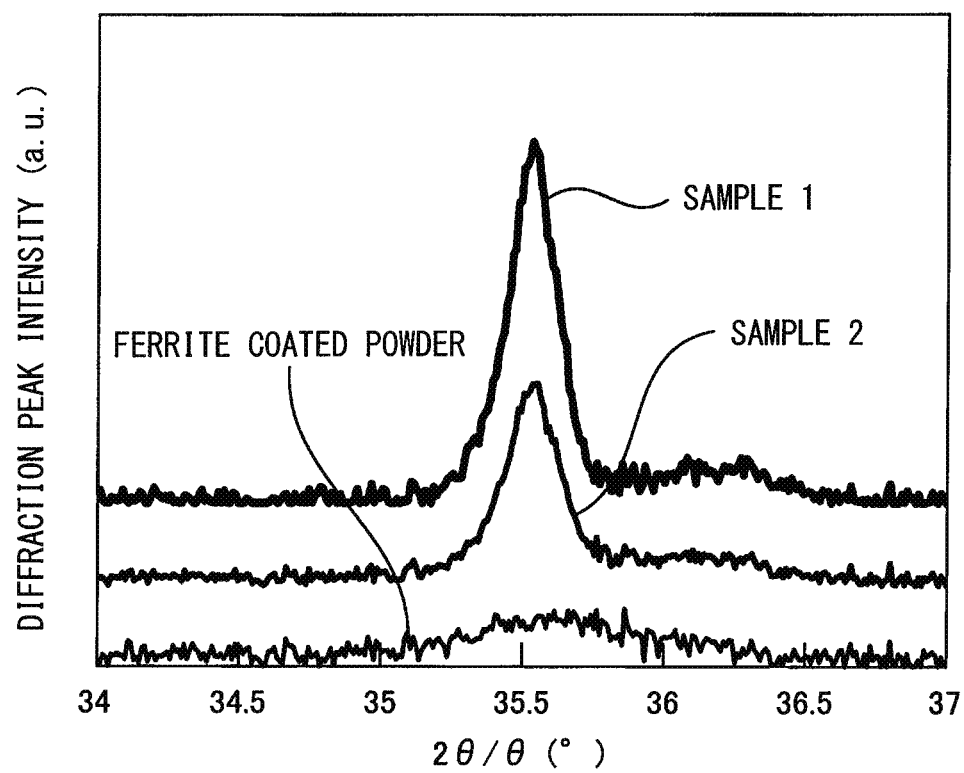
FIG. 8 shows powder X-ray diffraction patterns of a ferrite coated powder, a powder for a dust core in Sample 1, and a powder for a dust core in Sample 2, obtained in Experimental Example 1.

The powder X-ray diffraction patterns of a ferrite coated powder, the powder for a dust core of Sample 1, and the powder for a dust core of Sample 2 are measured by using a powder X-ray diffractometer ("RINT 2000" made by Rigaku Corporation) using a Cu tube as an X-ray source. The measurement range of a powder X-ray diffraction pattern is set in the range of 34° to 37° in 2θ/θ. As shown in FIG. 8, in the powder X-ray diffraction pattern of the ferrite coated powder, a diffraction peak derived from ferrite crystal grains having a spinel structure is not seen at 35.5° in 2θ/θ. This is because the ferrite coated powder has a film formed by depositing not-coarsely-crystallized ferrite fine particles over the surfaces of the pure iron particles.

In contrast, in each of the powder X-ray diffraction patterns of the powder for a dust core of Sample 1 and the powder for a dust core of Sample 2, a diffraction peak derived from ferrite crystal grains having a spinel structure is confirmed at 35.5° in 2θ/θ. Here, the half-value width of the diffraction peak in the powder for a dust core of Sample 1 is 0.2° and the half-value width of the diffraction peak in the powder for a dust core of Sample 2 is 0.42°. From the results, it can be said that a ferrite film having a narrower half-value width of a diffraction peak and a higher degree of crystallization can be formed by heat treatment of 600° C. than by heat treatment of 400° C.

Experimental Example 2 is explained. The following basic experiment is carried out in order to study production conditions for improving the compressive strength of a ferrite film in a powder for a dust core.

To directly measure the compressive strength of a ferrite film over the surfaces of soft magnetic metal particles is highly difficult. For the reason, in the present experimental example, conveniently a plurality of baked bodies formed by heat-treating ferrite powder compacts at various temperatures are produced and the compressive strength and the shrinkage rate of each of ferrite films are evaluated by using the baked bodies. Here, the compacting conditions of the compacts used for the respective baked bodies are set so as to be identical. Further, the heat treatment temperatures are set at the four levels of 200° C., 400° C., 600° C., and 1,000° C. The obtained results are shown in FIG. 9.

Figure 9:
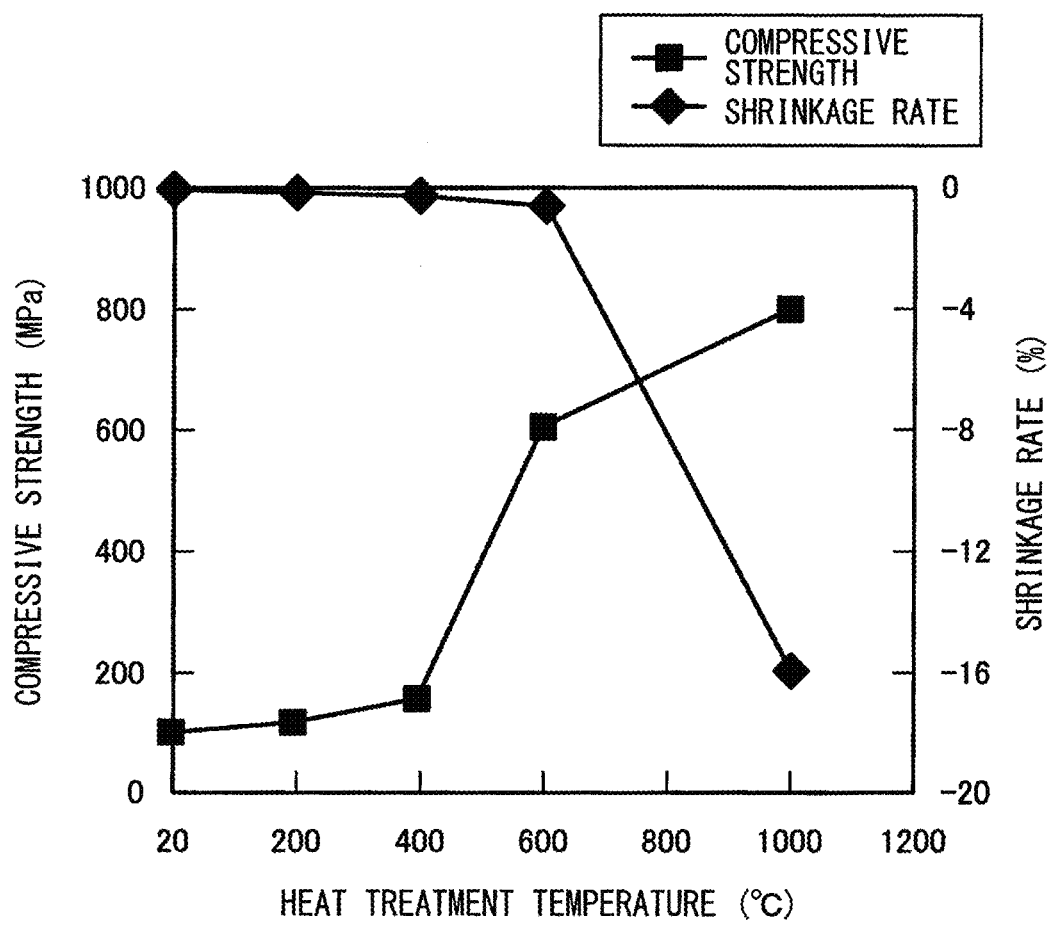
FIG. 9 is a graph showing a relationship of a compressive strength and a shrinking rate of a ferrite film with a heat treatment temperature when a powder for a dust core is produced, obtained in Experimental Example 2.

As shown in FIG. 9, the compressive strength of a baked body increases rapidly when a heat treatment temperature reaches 400° C. or higher. From the result, it can be said that the effect of improving the strength of a ferrite film by coarse crystallization of ferrite fine particles is likely to be obtained by setting the heat treatment temperature of the ferrite fine particles at 400° C. or higher during heat treatment. Further, it is obvious that the shrinkage rate of a baked body starts to increase when a heat treatment temperature exceeds 600° C. and the shrinkage rate comes to be about −16% at 1,000° C. From the results, it can be said that the shrinkage rate of a ferrite film does not increase excessively and the close contact between soft magnetic metal particles and the ferrite film is likely to improve by setting a heat treatment temperature of ferrite fine particles at 900° C. or lower during heat treatment.

That is, from the results, it is obvious that the balance between the effect of increasing the strength of a ferrite film by the coarse crystallization of ferrite fine particles and the effect of reducing the shrinkage rate of the ferrite film is superior by controlling a heat treatment temperature of the ferrite fine particles in the range of 400° C. to 900° C. during heat treatment. Further, from the results, it is obvious that the balance is particularly superior when the heat treatment temperature is around 600° C.

Experimental Example 3 is explained. A ferrite coated powder (not heat-treated) produced in Experimental Example 1, a powder for a dust core (heat-treated at 600° C.) of Sample 1, and a powder for a dust core (heat-treated at 400° C.) of Sample 2 are prepared. A plurality of dust cores are produced by compacting the respective powders and then annealing them at predetermined annealing temperatures and eddy losses are measured. The purpose of the present experimental example is to evaluate the heat resistance of the dust cores.

Specifically, a lubricant of 0.025% by mass is added to each of the powders. Here, a lubricant is applied to the dies used for powder compacting. Successively, warm powder compacting is applied to each of the powders at 130° C. under 1,300 MPa and respective powder compacts are obtained. Here, each of the powder compacts has a ring shape of 24 mm in outer diameter, 16 mm in inner diameter, and 5 mm in thickness.

Successively, a heat treatment furnace is used and the powder compacts are annealed at predetermined annealing temperatures for 1 hour under a pressure of 80 kPa in an $N_2$ gas atmosphere and cooled in the furnace. Here, the annealing temperatures are set at the three levels of 300° C., 450° C., and 600° C.

Figure 10:
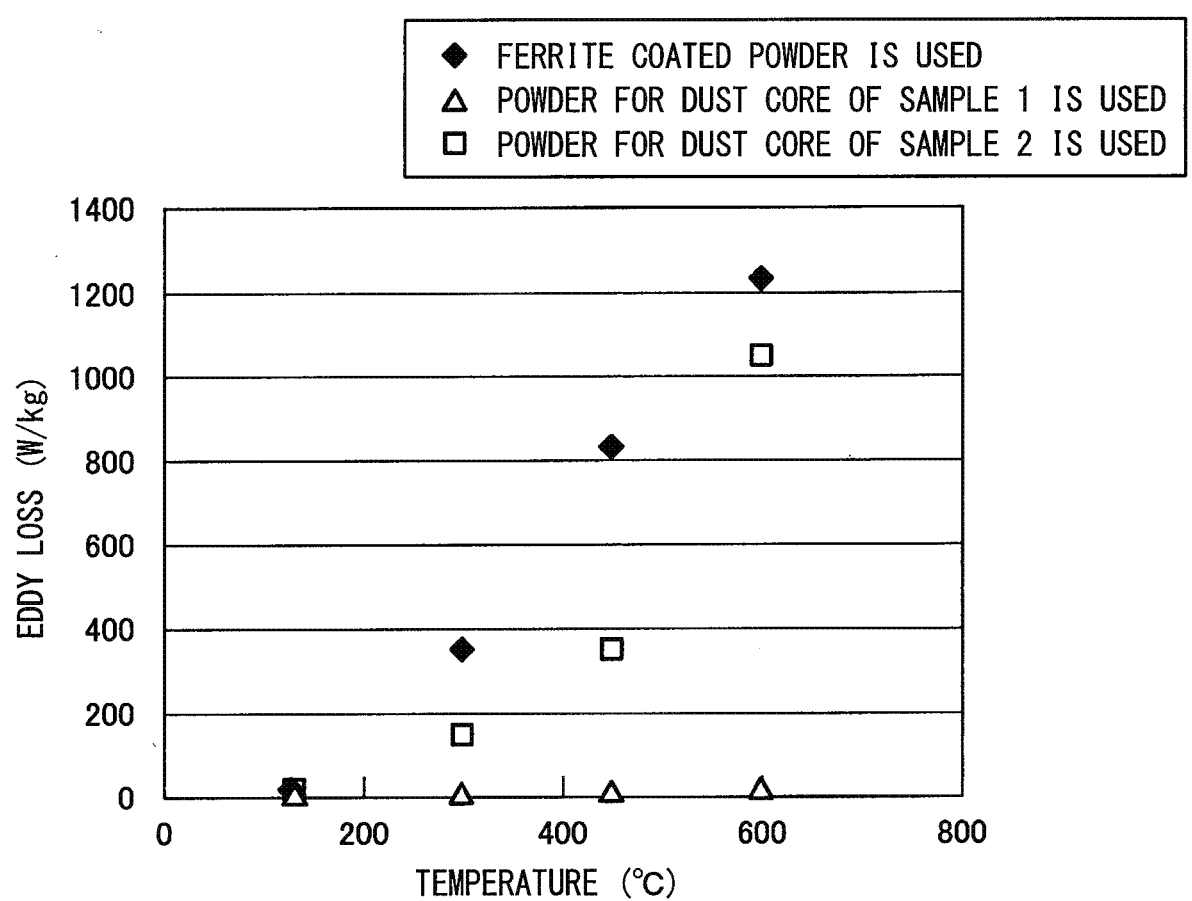
FIG. 10 is a graph showing a relationship between an annealing temperature and an eddy loss in a dust core, obtained in Experimental Example 3.

Successively, the annealed dust cores are wound with wires (primary side: 157 T, secondary side: 40 T) and eddy losses are measured under the conditions of a magnetic flux density $B_{10k}$ (magnetic field: 10,000 Nm) of 1 T and a frequency of 800 Hz. The results are shown in FIG. 10. Here, in FIG. 10, the temperature 130° C. on the horizontal axis means the temperature during warm powder compacting. Further, the temperatures 300° C., 450° C., and 600° C. on the horizontal axis mean the annealing temperatures respectively.

Figure 11:
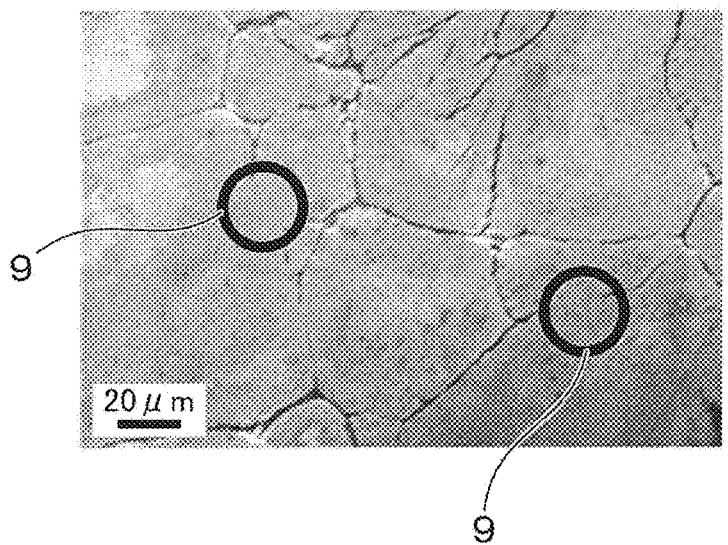
FIG. 11 is a sectional SEM image of a dust core (after annealing) comprising a ferrite coated powder, obtained in Experimental Example 3.

As shown in FIG. 10, in a dust core using a ferrite coated powder not heat-treated, an eddy loss increases rapidly as an annealing temperature rises. The reason is as follows. In a ferrite coated powder, a ferrite film is damaged by the friction between ferrite films and the deformation of pure iron particles during powder compacting, and adjacent pure iron particles touch each other and sinter at the damaged part of the ferrite film through the annealing after the powder compacting. As a result, in the ferrite coated powder, the insulation properties of the ferrite film deteriorate and the eddy loss increases. Actually, as shown in FIG. 11, in a dust core using a ferrite coated powder not heat-treated, a plurality of insulation gap parts 9 caused by a ferrite film are confirmed.

In contrast, in a dust core using a powder for a dust core of Sample 1 or Sample 2, it is obvious that an eddy loss hardly increases even when an annealing temperature rises in comparison with a dust core using a ferrite coated powder. That is, it can be said that, in a dust core using a powder for a dust core of Sample 1 or Sample 2, heat resistance improves in comparison with a dust core using a ferrite coated powder.

Figure 12:
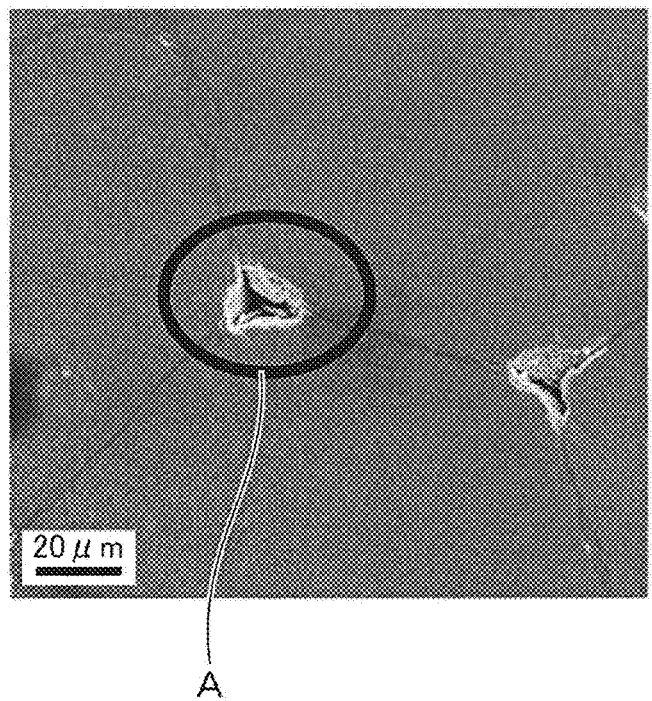
FIG. 12 is a sectional SEM image of a dust core (after powder compacting and before annealing) comprising a powder for a dust core in Sample 1, obtained in Experimental Example 3.
Figure 13:
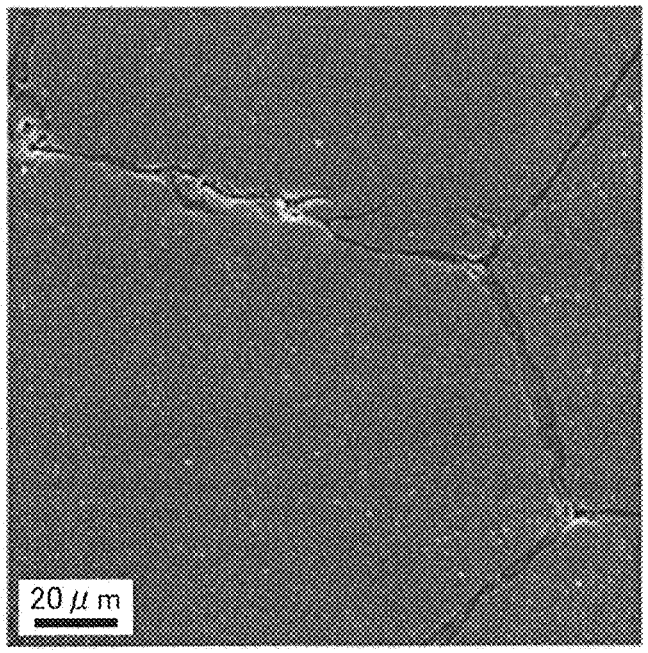
FIG. 13 is a sectional SEM image of a dust core (after annealing) comprising a powder for a dust core in Sample 1, obtained in Experimental Example 3.

In particular, it is obvious that a dust core using a powder for a dust core of Sample 1 of a high heat treatment temperature can effectively inhibit an eddy loss caused by annealing after powder compacting from increasing. As shown in FIG. 12, abrasion powder of a ferrite film caused by powder compacting does not deposit at a triple point A of soft magnetic particles. In this way, it is obvious that, in a dust core using a powder for a dust core of Sample 1, the effect of improving the strength of a ferrite film is large. Further, because the effect of improving the strength of a ferrite film is large, as shown in FIG. 13, in a dust core using a powder for a dust core of Sample 1, adjacent pure iron particles hardly sinter together after annealing and an insulation gap between the pure iron particles is likely to be maintained.

Experimental Example 4 is explained. The following basic experiment is carried out in order to study the effect obtained when a powder compact after compacted is annealed and further subjected to transformation heat treatment.

A ferrite film of 10 μm in thickness is formed over the surface of an iron plate of 0.3 mm in thickness (material: SPCC). Here, as a raw material powder for the ferrite film, a powder for a dust core (heat-treated at 600° C.) of Sample 1 produced in Experimental Example 1 is used. Furthermore, the ferrite film is formed by applying warm powder compacting to the powder for a dust core over the iron plate surface at 130° C. under 1,300 MPa. Test Specimen 1 is obtained through the processes. Here, in a test specimen used in the present experimental example, the arrangement of a soft magnetic metal constituting a soft magnetic metal particle and a ferrite film in a dust core is simulated.

Successively, a heat treatment furnace is used and Test Specimen 1 is annealed at 600° C. for 1 hour under a pressure of 80 kPa in an $N_2$ gas atmosphere and cooled in the furnace. Test Specimen 2 is obtained through the processes. Further, Test Specimen 2-1 is obtained similarly to the production of Test Specimen 2 except that the annealing temperature is set at 130° C. Furthermore, Test Specimen 2-2 is obtained similarly to the production of Test Specimen 2 except that the annealing temperature is set at 400° C.

Figure 14:
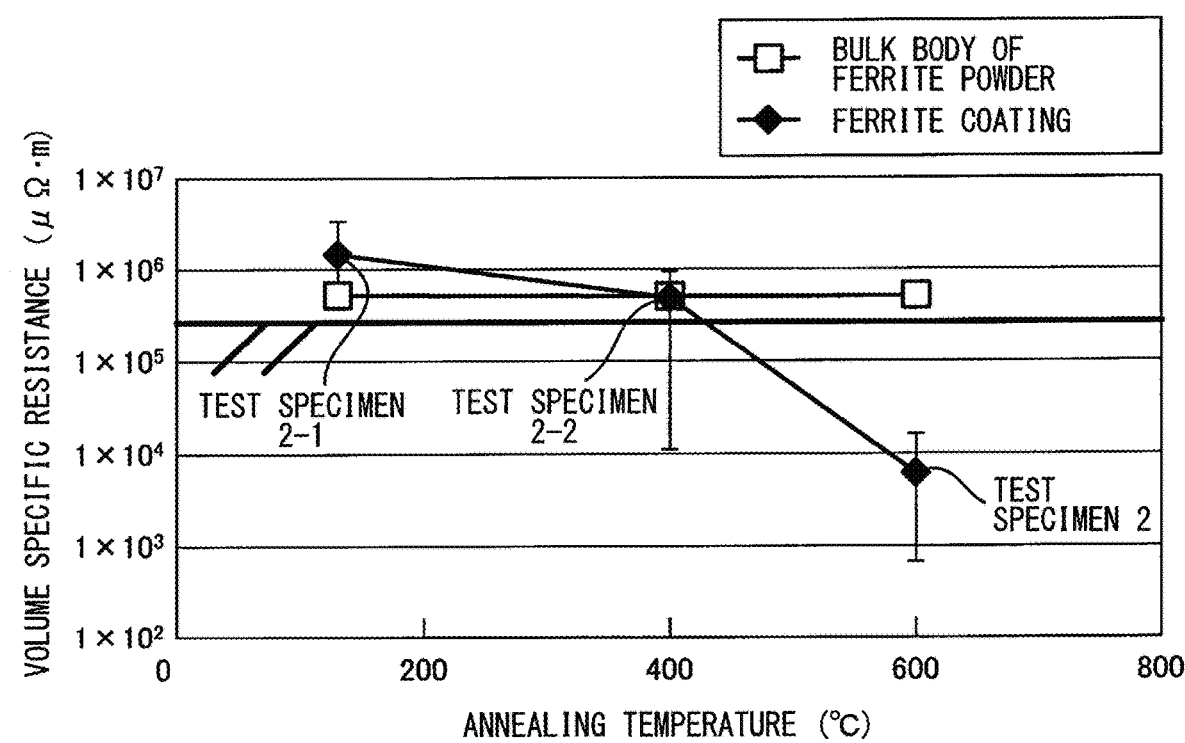
FIG. 14 is an explanatory graph showing volume specific resistances of respective ferrite films in Test Specimen 2 (600° C. annealing), Test Specimen 2-1 (130° C. annealing), and Test Specimen 2-2 (400° C. annealing) in contradistinction to a volume specific resistance of a bulk body of a ferrite powder, obtained in Experimental Example 4.

As shown in FIG. 14, in Test Specimen 2 annealed at an annealing temperature of 600° C. that is higher than other cases, the volume specific resistance of the ferrite film lowers by the annealing. Then, in order to analyze the structure of a ferrite film at an annealing temperature of around 600° C., the cross sections of Test Specimen 1 (before annealing) and Test Specimen 2 (after 600° C. annealing) are observed by an SEM. The results are shown in FIGS. 15A and 15B.

Figure 15A:
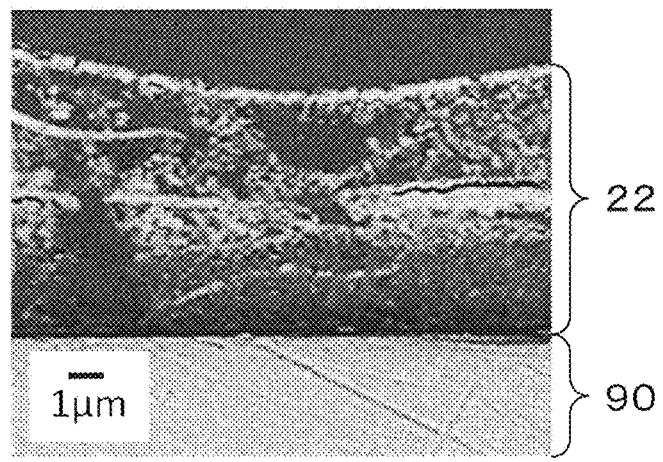
FIG. 15A is a sectional SEM image of Test Specimen 1 (before annealing) obtained in Experimental Example 4 and FIG. 15B is a sectional SEM image of Test Specimen 2 (after 600° C. annealing) obtained in Experimental Example 4.
Figure 15B:
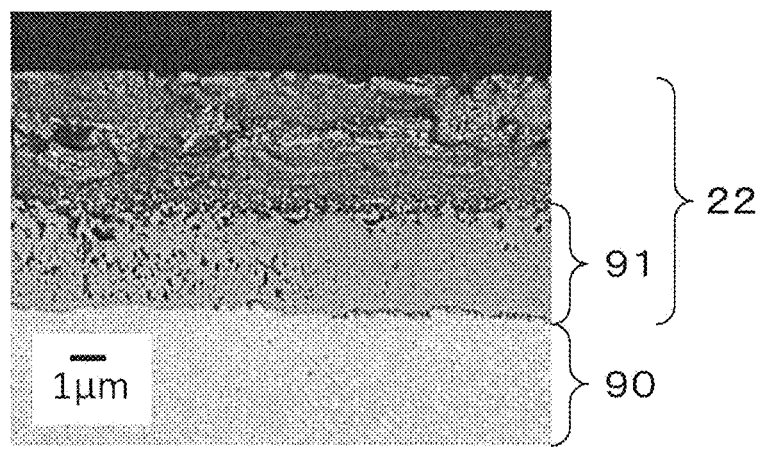
Figure 17:
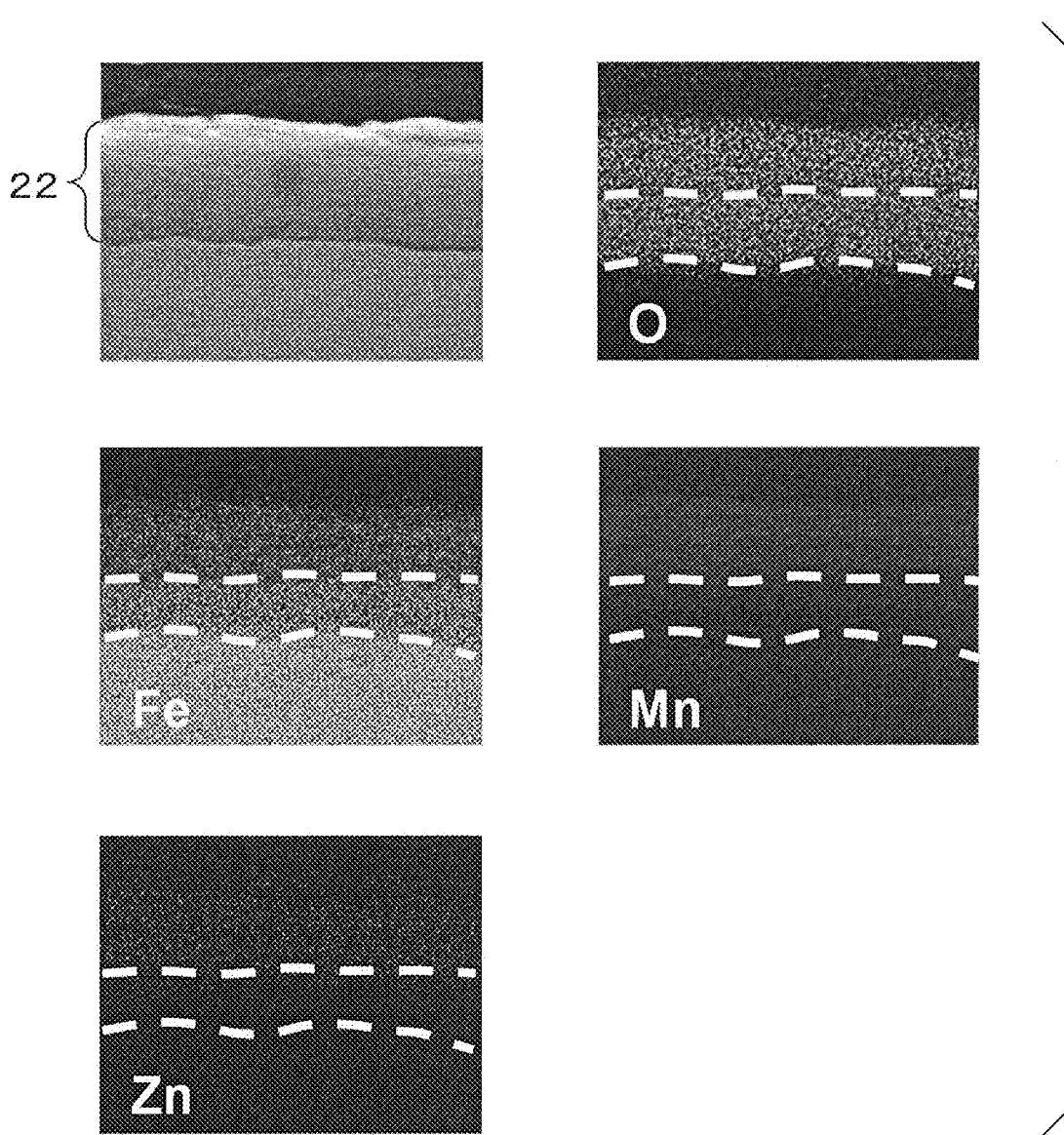
FIG. 17 is a result of element mapping of Test Specimen 2 (after 600° C. annealing), obtained in Experimental Example 4.
Figure 18:
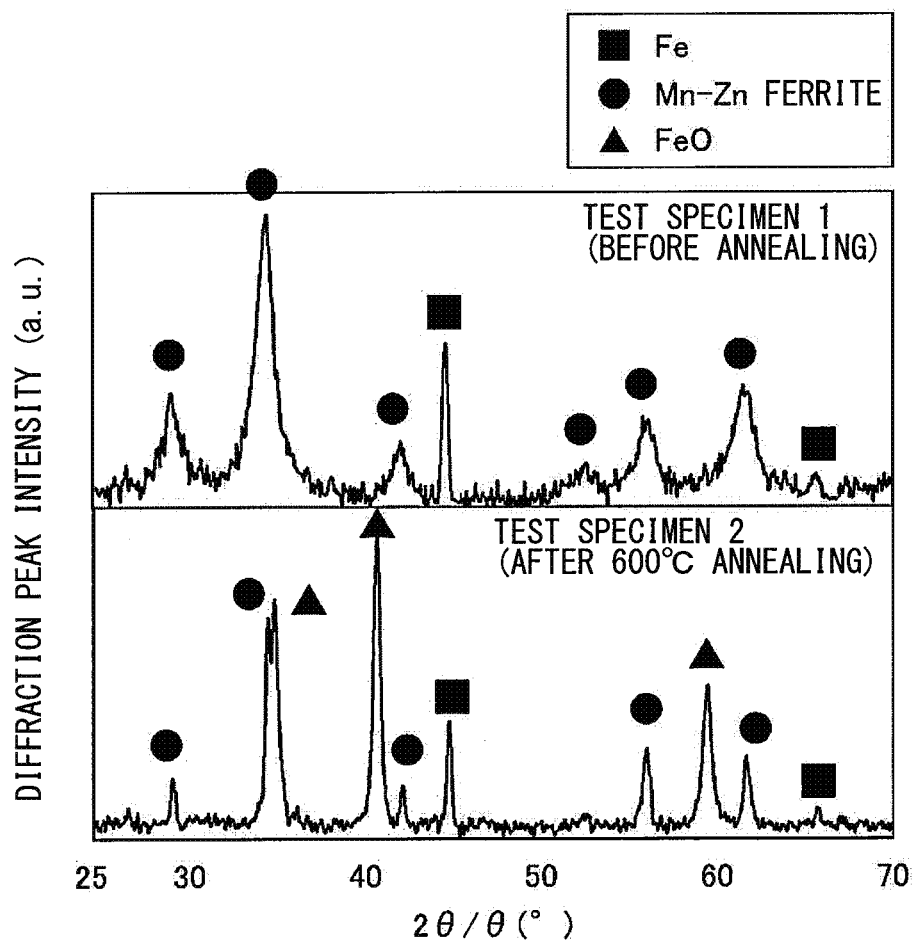
FIG. 18 shows powder X-ray diffraction patterns of Test Specimen 1 (before annealing) and Test Specimen 2 (after 600° C. annealing), obtained in Experimental Example 4.

As shown in FIGS. 15A and 15B, in Test Specimen 2 (after 600° C. annealing), the ferrite film 22 is thinner than the ferrite film of Test Specimen 1 (before annealing), and an intermediate layer 91 is formed between the iron plate 90 and the thinner ferrite film 22. Then, in order to specify the material of the intermediate layer 91, elemental analysis by SEM-EDX analysis and crystal structure analysis by powder X-ray diffraction are carried out. The results are shown in FIGS. 16 to 18.

Figure 16:
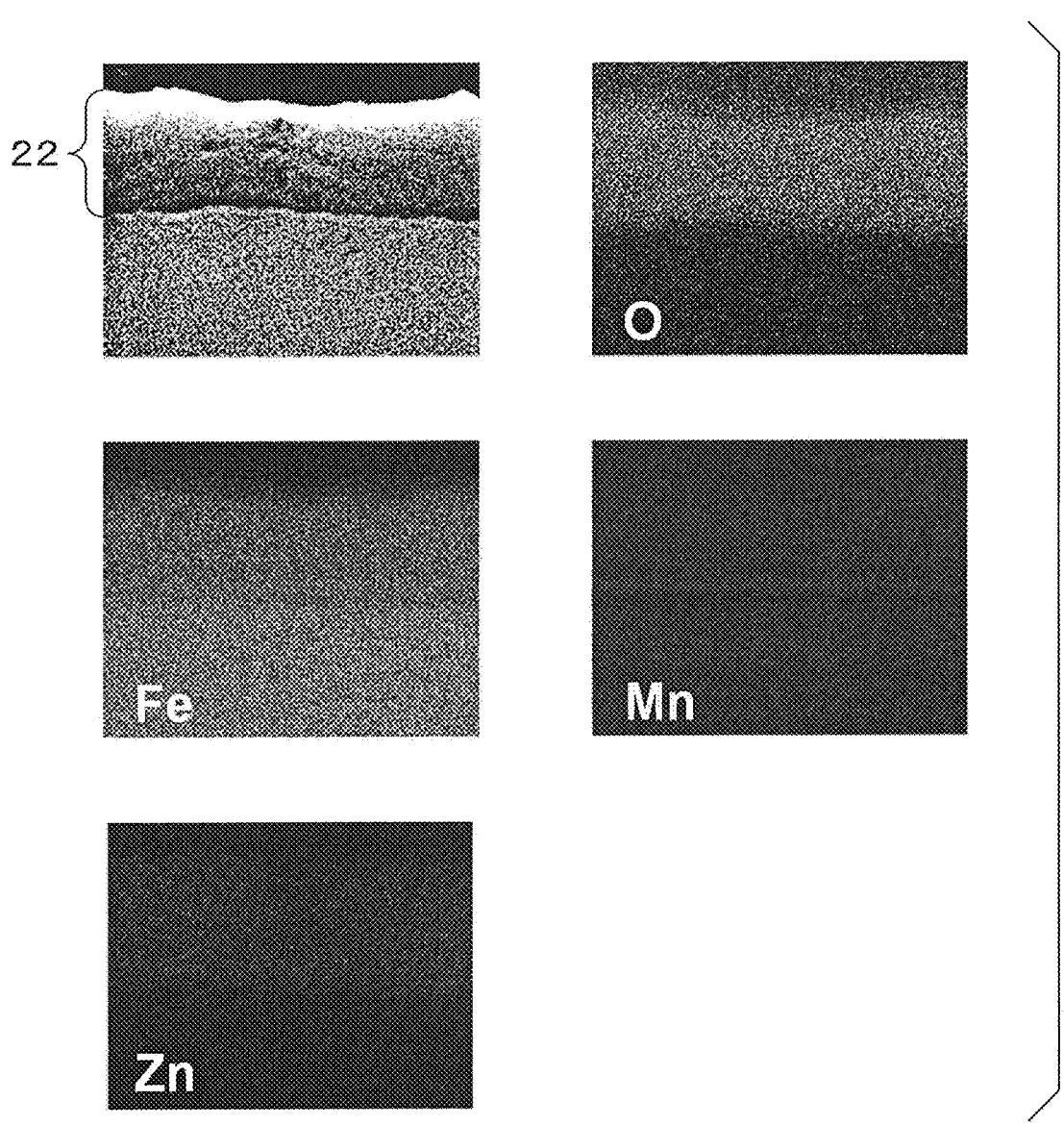
FIG. 16 is a result of element mapping of Test Specimen 1 (before annealing), obtained in Experimental Example 4.

As shown in FIG. 16, before annealing, O, Fe, Mn, and Zn which are elements constituting a ferrite film distribute over the whole film. In contrast, as shown in FIG. 17, after 600° C. annealing, although Fe and O are confirmed likewise at the part where the intermediate layer is confirmed in FIG. 15B, Zn and Mn almost disappear. From this, it is estimated that the intermediate layer is a chemical compound comprising Fe and O. Then, as shown in FIG. 18, diffraction peaks of FeO are observed in the ferrite film of Test Specimen 2 after annealed at 600° C. From those results, it is confirmed that the intermediate layer formed partially in the ferrite film by annealing is FeO. In other words, it is confirmed that the film structure of a ferrite film changes partially by annealing.

In this context, a method for re-ferritizing FeO formed in a ferrite film by annealing is studied. Specifically, re-ferritization of FeO is attempted by applying heat treatment at 560° C. or lower as a post-treatment after annealing in reference to a state diagram of an Fe—O system and in consideration of the fact that FeO is a thermodynamically unstable material and decomposes into $Fe_3O_4$ and Fe through the eutectoid transformation of $4FeO \rightarrow Fe_3O_4+Fe$ at 560° C. or lower.

More specifically, transformation heat treatment is applied at 500° C. for 2.5 hours in a water vapor atmosphere to Test Specimen 2 after annealed at 600° C. Thus, Test Specimen 3 is obtained. Successively, the volume specific resistances of Test Specimen 2 (after 600° C. annealing) and Test Specimen 3 (after 500° C. transformation heat treatment) are measured. As the results, the volume specific resistance of Test Specimen 2 is $6.08 \times 10^3$ [μΩ·m] and the volume specific resistance of Test Specimen 3 is $4.42 \times 10^5$ [μΩ·m]. From this, it is confirmed that the resistivity of a dust core can be recovered by applying transformation heat treatment after stress relief annealing is applied to a powder compact. Then, in order to analyze the film structure of a ferrite film before and after transformation heat treatment, elemental analysis by SEM-EDX analysis and crystal structure analysis by powder X-ray diffraction are applied to Test Specimen 2 (after 600° C. annealing) and Test Specimen 3 (after 500° C. transformation heat treatment) similarly to the above case. The results are shown in FIGS. 19 and 20.

Figure 19:
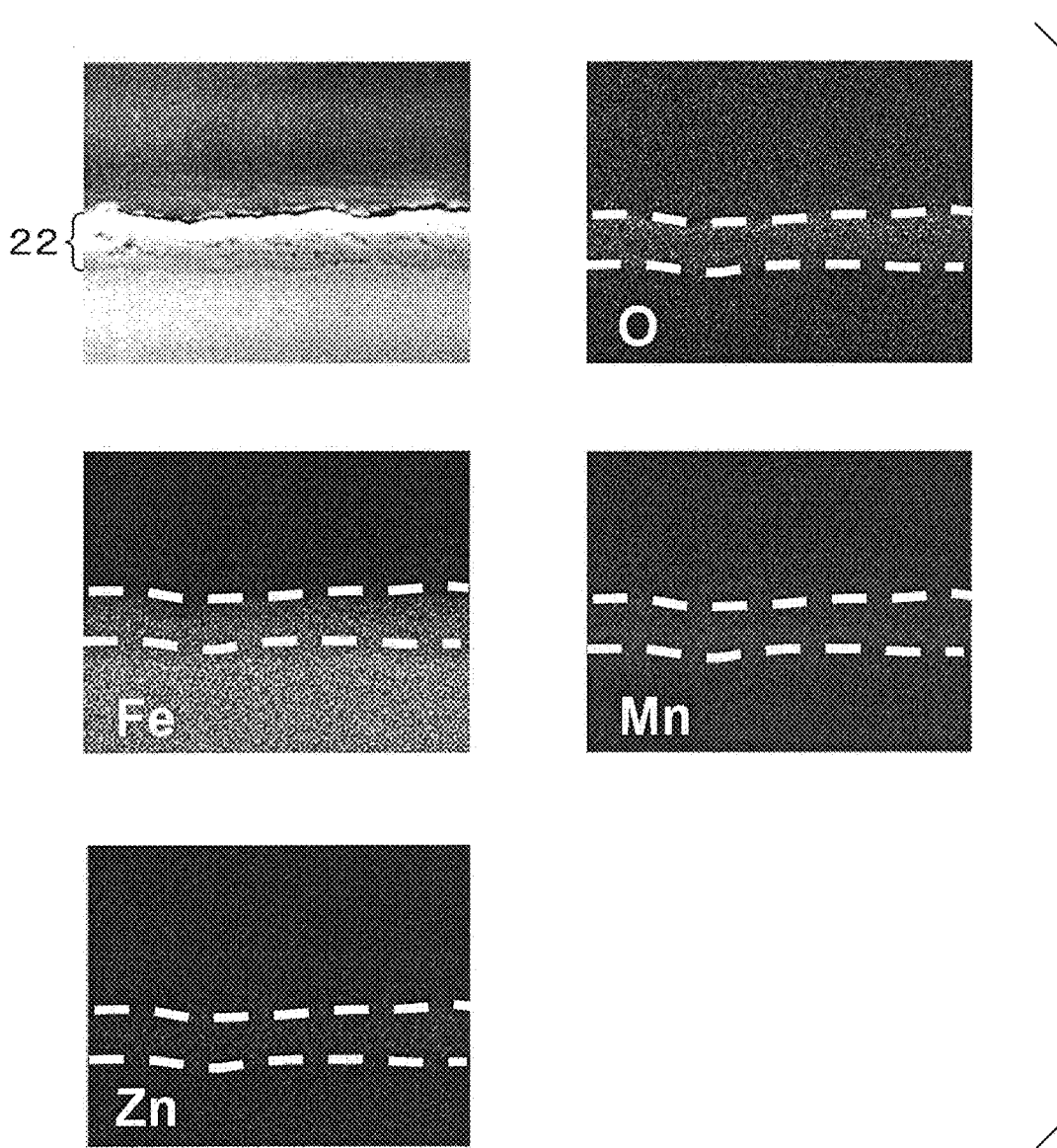
FIG. 19 is a result of element mapping of Test Specimen 3 (after 500° C. transformation heat treatment), obtained in Experimental Example 4.
Figure 20:
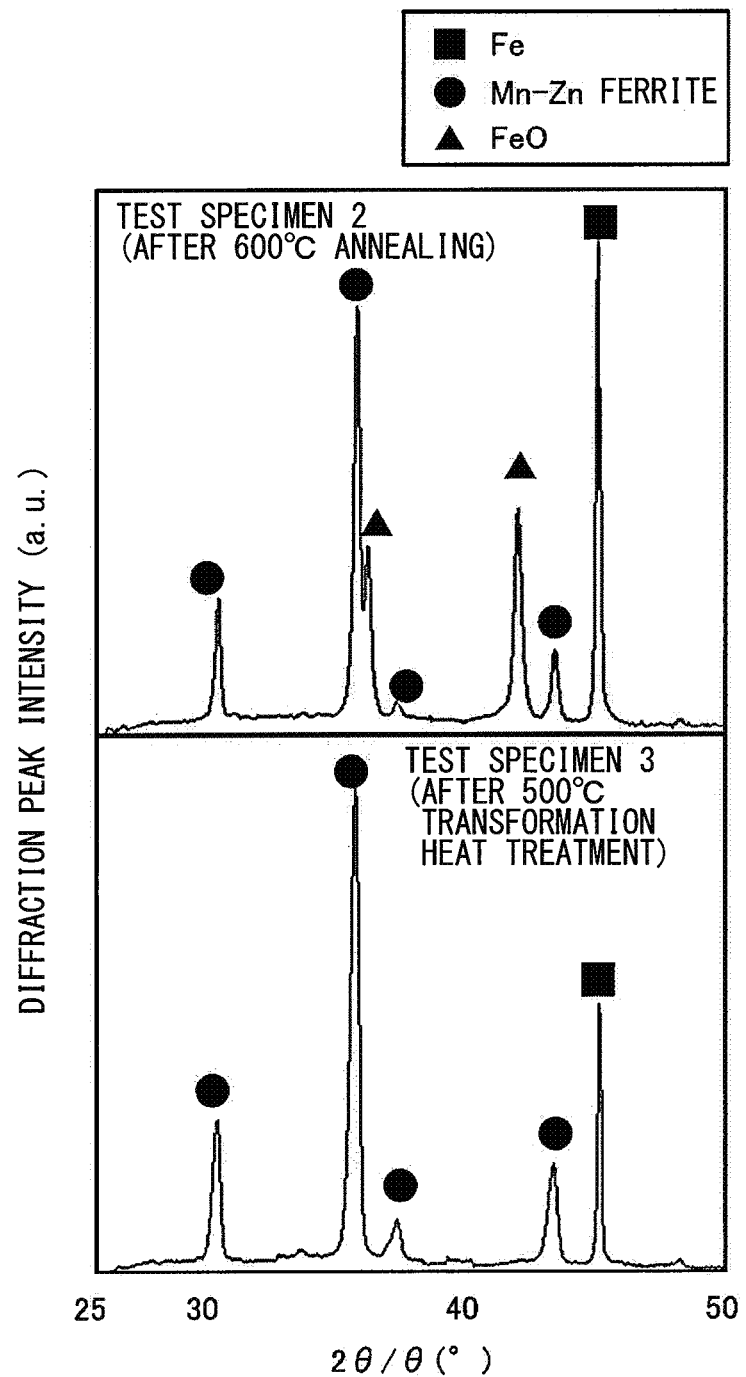
FIG. 20 shows powder X-ray diffraction patterns of Test Specimen 2 (after 600° C. annealing) and Test Specimen 3 (after 500° C. transformation heat treatment), obtained in Experimental Example 4.

FIG. 19 is compared with FIG. 17. As shown in FIG. 19, O, Fe, Mn, and Zn that are elements constituting a ferrite film distribute over the whole film after transformation heat treatment. Further, as shown in FIG. 20, the diffraction peaks of FeO that have been observed after 600° C. annealing are not seen after transformation heat treatment. From those results, it is confirmed that an intermediate layer comprising FeO disappears by transformation heat treatment and re-ferritization occurs. Here, it is estimated that Zn and Mn that have existed at a part where an intermediate layer comprising FeO is formed: are once taken into a thin ferrite film existing outside the intermediate layer; then are taken again into $Fe_3O_4$ formed by transformation heat treatment; and transform into $M_xFe_2O_4$.

Further, a transformation heat treatment temperature and a transformation heat treatment time are changed and the resistivity of a dust core is measured. As a result, when a transformation heat treatment temperature is set at 500° C. and a transformation heat treatment time is set at 1 hour or 2 hours, the recovery of a resistivity is confirmed. Likewise, when a transformation heat treatment temperature is set at 450° C. and a transformation heat treatment time is set at 1 hour or 2 hours, the recovery of a resistivity is confirmed. Likewise, when a transformation heat treatment temperature is set at 400° C. and a transformation heat treatment time is set at 1 hour or 2 hours, the recovery of a resistivity is confirmed. Furthermore, the trend of increasing the degree of recovering a resistivity as a transformation heat treatment time increases is seen. In contrast, the trend of decreasing the degree of recovering a resistivity as a transformation heat treatment temperature drops to lower than 350° C. is seen. From the results, it can be said that a transformation heat treatment temperature is preferably 350° C. or higher.

The present disclosure is not limited to the embodiments and the experimental examples and can be modified variously in the range not departing from the tenor of the present disclosure. Further, the configurations shown in the embodiments and the experimental examples can be combined arbitrarily.

While the present disclosure has been described with reference to embodiments thereof, it is to be understood that the disclosure is not limited to the embodiments and constructions. The present disclosure is intended to cover various modification and equivalent arrangements. In addition, the various combinations and configurations, other combinations and configurations, including more, less or only a single element, are also within the spirit and scope of the present disclosure.

The invention claimed is:

1. A powder for dust cores, comprising an aggregate of soft magnetic particles, each of which includes:
   a soft magnetic metal particle; and
   a ferrite film that covers a surface of the soft magnetic metal particle and includes ferrite crystal grains having a spinel structure,
   wherein
   a diffraction peak derived from the ferrite crystal grains exists in a powder X-ray diffraction pattern, the diffraction peak having a half-value width of 0.5° or less, and
   the ferrite film includes a part where an interface between the ferrite crystal grains has a straight-line shape in a sectional view of the ferrite film.

2. The powder for dust cores according to claim 1, wherein a size of each of the ferrite crystal grains is 10 nm or larger.

3. The powder for dust cores according to claim 1, wherein a chemical composition of the ferrite film is $M_xFe_2O_4$, where:
   M is at least one metal element selected from a group consisting of Fe, Cu, Mg, Ni, Zn, and Mn; and
   X satisfies an expression $0<X \leq 1$.

4. The powder for dust cores according to claim 3, wherein M, which is the at least one metal element, includes Mn and Zn, or Ni and Zn.

5. The powder for dust cores according to claim 1, wherein a thickness of the ferrite film is in a range of 20 to 600 nm.

6. A dust core that is a powder compact of the powder for dust cores recited in claim 1, and that has its strain removed.

7. The dust core according to claim 6, wherein a diffraction peak derived from FeO does not exist in the powder X-ray diffraction pattern.

8. A method for producing a dust core, comprising:
   a powder compacting process of compacting the powder for dust cores recited in claim 1 to obtain a powder compact;
   an annealing process of annealing the obtained powder compact; and
   a transformation heat treatment process of re-ferritizing FeO, which is produced partially in the ferrite film included in the annealed powder compact, through heat treatment.

9. The method for producing a dust core according to claim 8, wherein a heat treatment temperature in the transformation heat treatment process is 560° C. or lower.

10. The method for producing a dust core according to claim 8, wherein an atmosphere in the transformation heat treatment process is a water vapor atmosphere or an inert gas atmosphere.

11. A method for producing a powder for dust cores, comprising:
    preparing a raw material powder that includes an aggregate of soft magnetic metal particles;
    forming many ferrite fine particles on a surface of each of the soft magnetic metal particles of the raw material powder by a spray method; and
    coarsely crystallizing the ferrite fine particles through heat treatment to form a ferrite film, which includes ferrite crystal grains having a spinel structure, on the surface of the each of the soft magnetic metal particles,
    wherein the heat treatment comprises heating the ferrite fine particles to a temperature in a range of 400 to 900° C.

12. The method for producing a powder for dust cores according to claim 11, wherein an atmosphere during the heat treatment is an inert gas atmosphere or a vacuum atmosphere.

13. A dust core comprising:
a soft magnetic metal particle; and
a ferrite film that covers a surface of the soft magnetic metal particle and includes ferrite crystal grains having a spinel structure,
wherein
a diffraction peak derived from the ferrite crystal grains exists in a powder X-ray diffraction pattern,
the ferrite film includes a part where an interface between the ferrite crystal grains has a straight-line shape in a sectional view of the ferrite film, and
strain of the dust core has been removed.

* * * * *